US009524810B2

(12) United States Patent
Aase et al.

(10) Patent No.: US 9,524,810 B2
(45) Date of Patent: *Dec. 20, 2016

(54) CABLE STRUCTURE FOR PREVENTING TANGLING

(71) Applicant: Apple Inc., Cupertino, CA (US)

(72) Inventors: Jonathan S. Aase, Redwood City, CA (US); Cameron P. Frazier, San Carlos, CA (US); Matthew D. Rohrbach, San Francisco, CA (US); Peter N. Russell-Clarke, San Francsico, CA (US); Dale N. Memering, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 14/148,074

(22) Filed: Jan. 6, 2014

(65) Prior Publication Data

US 2014/0116774 A1 May 1, 2014

Related U.S. Application Data

(63) Continuation of application No. 12/942,531, filed on Nov. 9, 2010, now Pat. No. 8,625,836.

(60) Provisional application No. 61/259,617, filed on Nov. 9, 2009.

(51) Int. Cl.
*H02G 3/00* (2006.01)
*H01B 5/00* (2006.01)
*H04R 1/10* (2006.01)

(52) U.S. Cl.
CPC .............. *H01B 5/00* (2013.01); *H04R 1/1033* (2013.01); *Y10T 29/49117* (2015.01)

(58) Field of Classification Search
CPC ................................ H04R 1/1033; H01B 5/00
USPC ......................................... 381/384; 174/70 R
See application file for complete search history.

(56) References Cited

U.S. PATENT DOCUMENTS

| | | | | |
|---|---|---|---|---|
| 3,795,757 | A | 3/1974 | Higgins | |
| 5,168,128 | A | 12/1992 | Thomsen | |
| 6,653,568 | B1 * | 11/2003 | Davis | H02G 3/0481 174/135 |

(Continued)

FOREIGN PATENT DOCUMENTS

| | | |
|---|---|---|
| WO | 92/03368 | 3/1992 |
| WO | 2005/022560 | 3/2005 |
| WO | 2006/024074 | 3/2006 |

*Primary Examiner* — Ahmad F. Matar
*Assistant Examiner* — Katherine Faley
(74) *Attorney, Agent, or Firm* — Van Court & Aldridge LLP

(57) ABSTRACT

This is directed to a cable structure for use with an electronic device. The cable structure can include one or more conductors around which a sheath is provided. To prevent the cable structure from tangling, the cable structure can include a core placed between the conductors and the sheath, where a stiffness of the core can be varied along different segments of the cable structure to facilitate or hinder bending of the cable structure in different areas. The size and distribution of the stiffer portions can be selected to prevent the cable from forming loops. The resistance of the core to bending can be varied using different approaches including, for example, by varying the materials used in the core, varying a cross-section of portions of the core, or combinations of these.

19 Claims, 8 Drawing Sheets

(56) References Cited

U.S. PATENT DOCUMENTS

| | | | | |
|---|---|---|---|---|
| 7,332,676 | B2 * | 2/2008 | Sparrowhawk .... | H01B 11/1008 174/102 R |
| 7,355,119 | B2 | 4/2008 | Katz et al. | |
| 8,625,836 | B2 * | 1/2014 | Aase .................... | H04R 1/1033 174/70 R |
| 2002/0117324 | A1 | 8/2002 | Wang | |
| 2003/0230427 | A1 | 12/2003 | Gareis | |
| 2007/0025579 | A1 | 2/2007 | Kolton | |
| 2010/0159741 | A1 * | 6/2010 | Rothbaum .............. | F16G 11/00 439/501 |
| 2011/0083898 | A1 | 4/2011 | Miller | |

* cited by examiner

CABLE STRUCTURE FOR PREVENTING TANGLING

CROSS-REFERENCE TO RELATED APPLICATION

This application is a continuation of U.S. patent application Ser. No. 12/942,531, filed Nov. 9, 2010 (now U.S. Pat. No. 8,625,836), which claims the benefit of U.S. Provisional Patent Application No. 61/259,617, filed Nov. 9, 2009. Each of these earlier applications is incorporated by reference herein in its entirety.

BACKGROUND

A cable can be used to provide analog or digital signals between electronic components. For example, a cable can be used to connect a device to an audio output component used to provide audio from the device to a user. When not in use, a user can store the cable, for example in a pocket, bag, drawer, or other location. If the cable is not carefully stored and left alone, however, the cable can be subject to tangling. For example, the cable can rub against itself and tangle or even create knots. When the user later wishes to use the cable, the user may first be required to untangle the cable. If the cable is very tangled, or has a tightened knot, the user's experience using the cable may be adversely affected.

SUMMARY

This is directed to a cable structure having incorporated features for preventing tangling for use with an electronic device.

A cable structure can include one or more conductors providing a path for transferring signals. To protect the conductors, an outer sheath can be placed around the conductors and can provide an external surface for the cable. In some cases, the cable structure can include a core placed between the conductors and the sheath to center the conductors within the cable structure, to ensure a desired diameter for the cable structure, or to provide stiffness to the cable structure. The stiffness provided by the core can reduce or control tangling of the cable by controlling how the cable structure bends.

Different sections of the cable structure can include different mechanical properties that define a manner in which the section of the cable structure can bend. For example, different sections can be constructed from different materials. As another example, the core can have different shapes that favor bending in particular directions, or prevent bending in other directions in different sections. The different sections can be distributed in the cable using different approaches including, for example, by alternating sections having different properties.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

A user can consume content provided by an electronic device using several approaches. In some embodiments, an external component can be coupled to the device so that signals corresponding to content to output can be provided to an interface for outputting the content. For example, a headset having a non-cable component (e.g., headphones) for converting digital audio signals to analog sound waves detectable by a user's ears can be coupled to a device. The headset can include a cable structure providing a path between different non-cable components of the headset (e.g., between an audio plug and headphones). The headset can include features that control bending of the cable structure to prevent tangling. For example, the cable structure can include several sections having different mechanical properties defining bending capabilities of the cable structure.

Figure 1A:
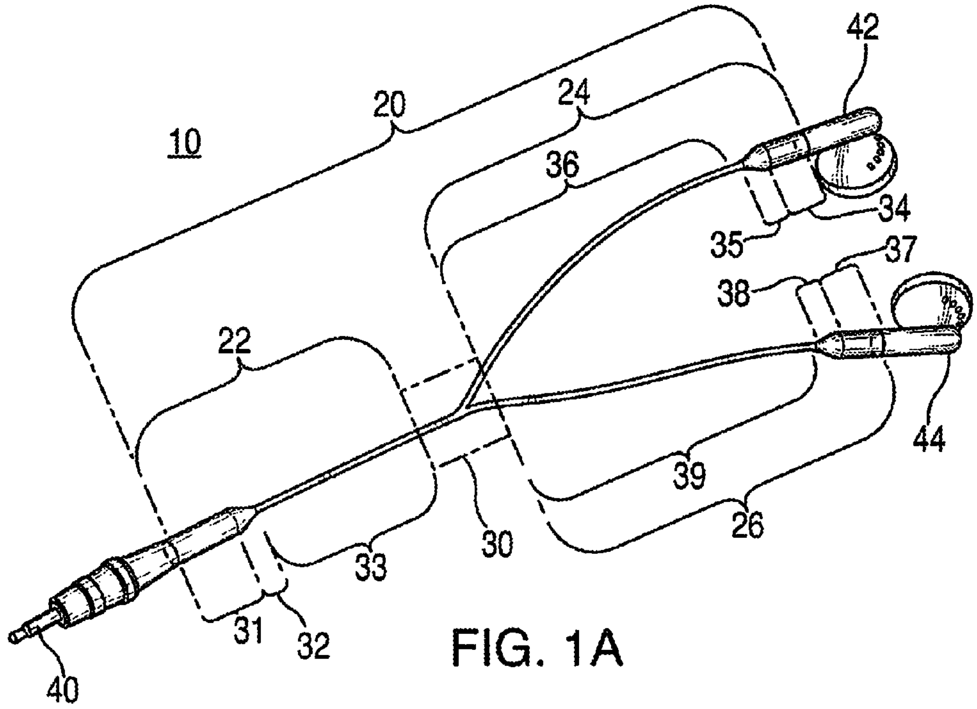
FIGS. 1A and 1B illustrate different headsets having a cable structure that seamlessly integrates with non-cable components in accordance with some embodiments of the invention.

FIG. 1A shows an illustrative headset 10 having cable structure 20 that seamlessly integrates with non-cable components 40, 42 and 44. Cable structure 20 has three legs 22, 24, and 26 joined together at bifurcation region 30. Leg 22 may be referred to herein as base leg 22 or main leg 22, and includes the portion of cable structure 20 existing between non-cable component 40 and bifurcation region 30. In particular, main leg 22 includes interface region 31, taper region 32, and non-interface region 33. Leg 24 may be referred to herein as left leg 24, and includes the portion of cable structure 20 existing between non-cable component 42 and bifurcation region 30. Leg 26 may be referred to herein as right leg 26, and includes the portion of cable structure 20 existing between non-cable component 44 and bifurcation region 30. Both left and right legs 24 and 26 include respective interface regions 34 and 37, taper regions 35 and 38, and non-interface regions 36 and 39. The non-cable components can include, for example, a jack or a headphone (e.g., non-cable component 40 is a jack, and non-cable components 42 and 44 are headphones).

The non-interface region of the legs has a predetermined diameter and length. The diameter of main leg 22 may be larger than or the same as the diameters of left and right legs 24 and 26. For example, leg 22 may contain conductors for both left and right legs 24 and 26 and may therefore require a greater diameter to accommodate all conductors. In some embodiments, it is desirable to manufacture the non-interface regions to have the smallest diameter possible, for aesthetic reasons. As a result, the diameter of the non-interface regions can be smaller than the diameter of any non-cable component (e.g., jack or headphone) physically connected to the interface region. Since it is desirable for cable structure 20 to seamlessly integrate with the non-cable components, the legs may vary in diameter from the non-interface region to the interface region.

The taper region can handle the transition from the interface region to the non-interface region. The transition in the taper region can take any suitable shape that exhibits a fluid or smooth transition from the interface region to the non-interface regions. For example, the shape of the taper region can be similar to that of a cone or a neck of a wine bottle.

The interface region has a predetermined diameter and length. The diameter of the interface region is substantially the same as the diameter of the non-cable component it is physically connected to, to provide an aesthetically pleasing seamless integration. Because the non-cable component typically has a diameter greater than the diameter of the non-interface region, the diameter of the interface region is larger than that of the non-interface regions. Consequently, in some embodiments, the taper region decreases in size from the interface region to the non-interface region.

The combination of the interface and taper regions can provide strain relief for those regions of headset 10. Strain relief may be realized because the interface and taper regions have larger dimensions than the non-interface region and thus are more robust. These larger dimensions may also ensure that non-cable portions are securely connected to cable structure 20. Moreover, the extra girth better enables the interface and taper regions to withstand bend stresses.

The interconnection of the three legs at bifurcation region 30 can vary depending on how the cable structure 20 is manufactured. In one approach, cable structure 20 can be a single-segment unibody cable structure. In this approach all three legs are manufactured jointly as a single-segment and no additional processing is required to electrically couple the conductors contained therein. That is, none of the legs are spliced to interconnect conductors at the bifurcation region. Some single-segment unibody cable structures may have a top half and a bottom half, which are molded together and extend throughout the entire unibody cable structure. For example, such single-segment unibody cable structures can be manufactured using injection molding and compression molding manufacturing processes. Thus, although a mold-derived single-segment unibody cable structure has two components (i.e., the top and bottom halves), it is considered a single-segment unibody cable structure. Other single-segment unibody cable structures may exhibit a contiguous ring of material that extends throughout the entire unibody cable structure. For example, such a single-segment cable structure can be manufactured using an extrusion process.

In another approach, cable structure 20 can be a multi-segment unibody cable structure. A multi-segment unibody cable structure may have the same appearance of the single-segment unibody cable structure, but the legs are manufactured as discrete components. The legs and any conductors contained therein are interconnected at bifurcation region 30. The legs can be manufactured using many of the same processes used to manufacture the single-segment unibody cable structure.

The cosmetics of bifurcation region 30 can be any suitable shape. In one embodiment, bifurcation region 30 can be an overmold structure that encapsulates a portion of each leg 22, 24, and 26. The overmold structure can be visually and tactically distinct from the legs. The overmold structure can be applied to the single or multi-segment unibody cable structure. In another embodiment, bifurcation region 30 can be a two-shot injection molded splitter having the same dimensions as the legs being joined together. Thus, when the legs are joined together with the splitter mold, cable structure 20 maintains its unibody aesthetics. That is, a multi-segment cable structure has the look and feel of single-segment cable structure even though it has at three discretely manufacture legs joined together at bifurcation region 30. Many different splitter configurations can be used, and the use of some splitters may be based on the manufacturing process used to create the segment.

Cable structure 20 can include any suitable component extending through the legs for providing electrical or mechanical functionality. In one implementation, one or more electrical conductors can extend from base leg 22 to one or both of left leg 24 and right leg 26 to provide a path for electrical signals through cable structure 20. For example, audio signals can be transferred from non-cable component 40 to non-cable components 42 and 44 via the conductors. Headset 10 can include any suitable number of conductors such as, for example, six electrical conductors in base leg 22 that split such that two of the six conductors are routed to left leg 24 and four of the six conductors are routed to right leg 26.

Figure 1B:
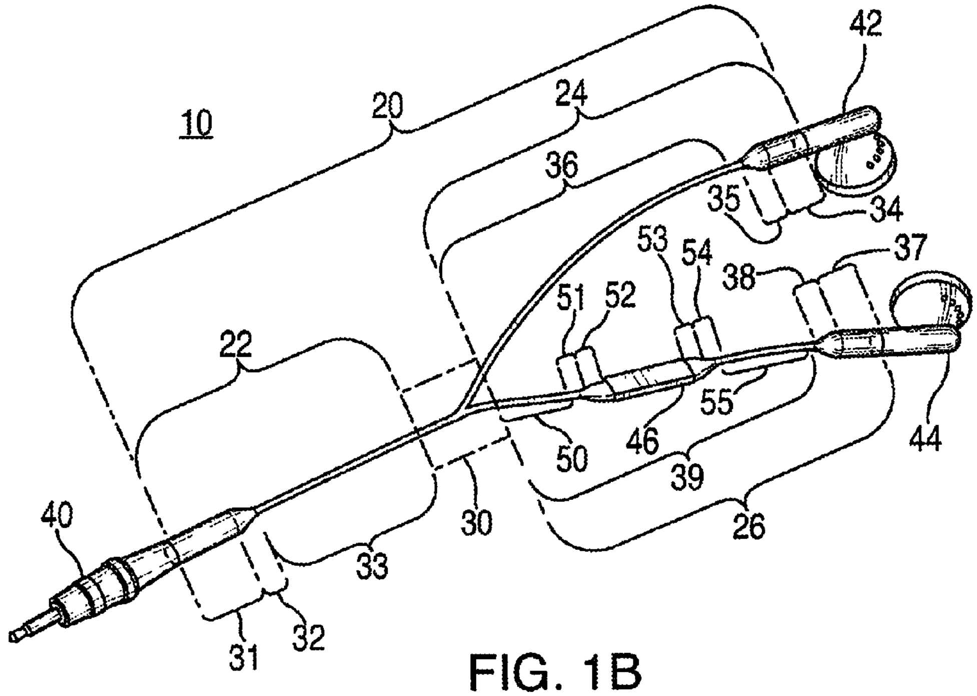

In some embodiments, another non-cable component can be incorporated into either left leg 24 or right leg 26. As shown in FIG. 1B, non-cable component 46 is integrated within leg 26, and not at an end of a leg like non-cable components 40, 42 and 44. For example, non-cable component 46 can be a communications box that includes a microphone and a user interface. Non-cable component 46 can be electrically coupled to non-cable component 40, for example, to transfer signals between non-cable component 46 and one or more of non-cable components 40, 42 and 44.

Non-cable component 46 can be incorporated in non-interface region 39 of leg 26. In some cases, non-cable component 46 can have a larger size or girth than leg 26, which can cause a discontinuity at an interface between non-interface region 39 and non-cable component 46. To ensure that the cable maintains a seamless unibody appearance, non-interface region 39 can be replaced by first non-interface region 50, first taper region 51, first interface region 52, non-cable component 46, second interface region 53, second taper region 54, and second non-interface region 55.

Similar to the taper regions described above in connection with the cable structure of FIG. 1A, taper regions 51 and 54 can handle the transition from non-cable component 46 to the non-interface region. The transition in the taper region can take any suitable shape that exhibits a fluid or smooth transition from the interface region to the non-interface regions. For example, the shape of the taper region can be similar to that of a cone or a neck of a wine bottle.

Similar to the interface regions described above in connection with the cable structure of FIG. 1A, interface regions 52 and 53 can have a predetermined diameter and length. The diameter of the interface region is substantially the same as the diameter of non-cable component 46 to provide an aesthetically pleasing seamless integration. In addition, and as described above, the combination of the interface and taper regions can provide strain relief for those regions of headset 10.

In some cases, a cable structure such as cable structure 20 can include one or more components for preventing tangling of the cable. For example, a cable structure can include a rod constructed from a superelastic material (e.g., Nitinol) extending through the length of the cable structure. The rod can prevent or reduce bending of the cable structure to prevent tangling.

Cable structure 20 can be constructed using many different manufacturing processes. The processes discussed herein include those that can be used to manufacture the single-segment unibody cable structure or legs for the multi-segment unibody cable structure. In particular, these processes include injection molding, compression molding, and extrusion.

Figure 2:
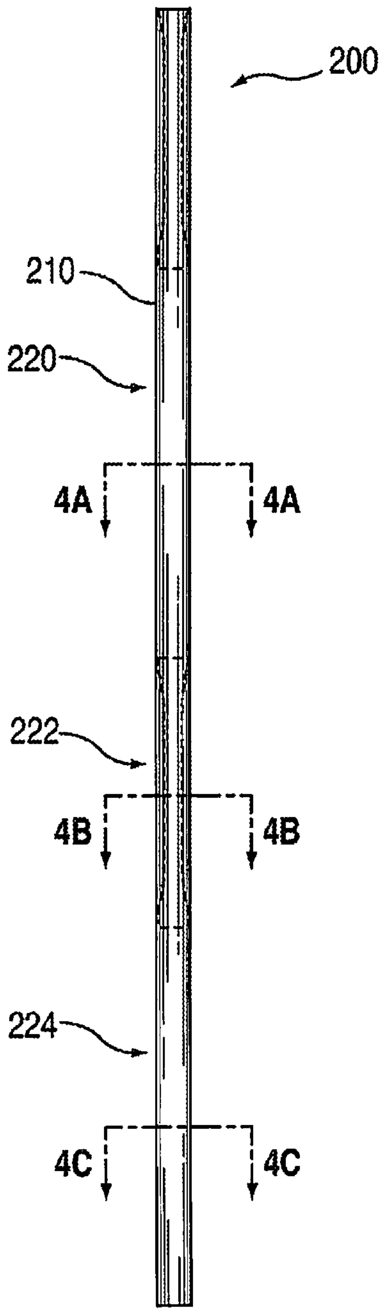
FIG. 2 is an illustrative view of a portion of a cable structure in accordance with some embodiments of the invention.
Figure 3:
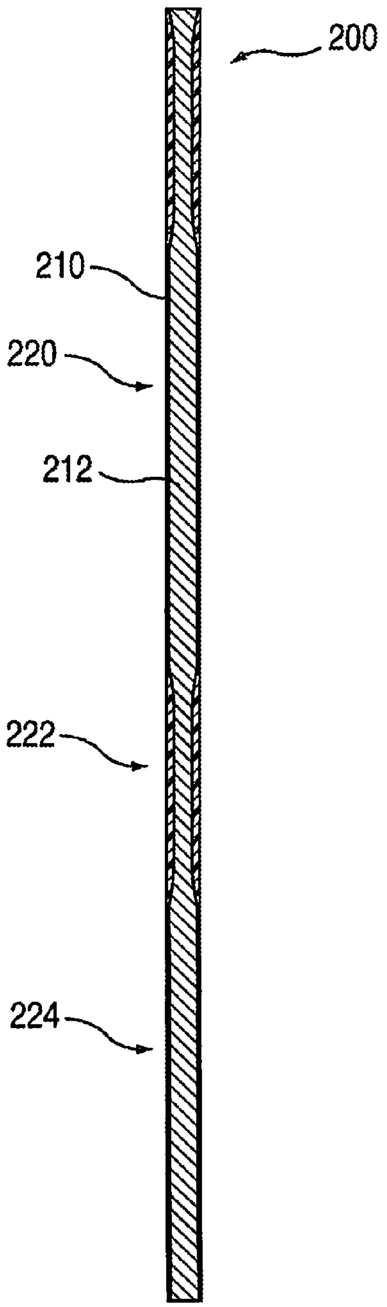
FIG. 3 is a sectional view of the portion of the cable structure of FIG. 2 in accordance with some embodiments of the invention.

Each leg of the cable structure can be constructed from at least one conductor surrounded by an outer shell. In some cases, a core can be placed between the conductors and the shell. FIG. 2 is an illustrative view of a portion of a cable structure in accordance with some embodiments of the invention. FIG. 3 is a sectional view of the portion of the cable structure of FIG. 2 in accordance with some embodiments of the invention. Cable structure 200 can include shell 210 placed over core 212, which can enclose conductors (not shown). In some cases, core 212 can be incorporated as part of shell 210.

The conductors used in each cable structure can be constructed from any suitable conductive material. For example, the conductors can be constructed from a metal (e.g., copper or gold), a conductive composite material (e.g., a composite with integrated silicon), a conductive solution (e.g., an ionic solution constrained within a tube extending through a leg), or combinations of these. In one implementation, each conductor can include one or more drawn wires (e.g., a single drawn wire or several wires wrapped concentrically around a core). If a cable structure includes several conductors, each of the conductors can be shielded from each other by a non-conductive sheath or coating. For example, a plastic can be extruded over a conductor. As another example, a non-conductive coating can be applied via deposition or by dipping a conductor in a non-conductive material (e.g., in a liquid bath of material).

Shell 210 can provide a cosmetic surface or layer for each cable structure. The material selected for shell 210 can have a color (e.g., white) and a texture (e.g., smooth) selected based on industrial design considerations. The material selected may have mechanical properties that allow a user to comfortably deform a cable structure during use (e.g., such that the cable does not resist to earpieces being placed in a user's ear). In particular, the material used for shell 210 can have limited stiffness or resistance to bending. The material, however, may be resistant to punctures, abrasions, stretching, and shrinking to maintain the aesthetic appearance of the cable as it is used. Shell 210 can be disposed over the conductors using any suitable approach including, for example, molding or feeding a tube over the conductors.

In some implementations, neither the conductor nor shell 210 may provide meaningful resistance to bending or tangling. Instead, core 212 provided between the conductor and shell 210 can serve to prevent tangling of the cable. Accordingly, the material used for core 212 can include mechanical properties that ensure a minimum resistance to bending (e.g., materials that have at least pre-determined yield stress or strain, or modulus of elasticity). Such materials can include, for example, a thermoplastic elastomer (TPE), thermoplastic polyurethane (TPU), a polymer, another plastic, a malleable metal, a composite material, or combinations of these.

Several approaches can be used to control the bending, and thus the tangling, of each leg of a cable structure. In some cases, a cable structure can include different sections that are susceptible to bending in different manners (e.g., in different amounts, locations, and directions or orientations). In one implementation, a cable structure can include some stiffer portions that are less susceptible to bending, and other less stiff portions that are more susceptible to bending.

Figure 4A:
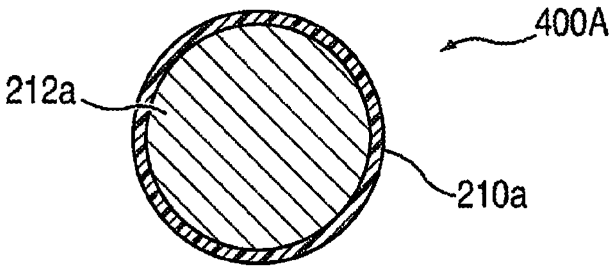
FIG. 4A-4C are cross-sectional views of cable structure 200 taken at lines A-A, B-B, and C-C, respectively, in accordance with some embodiments of the invention.
Figure 4B:
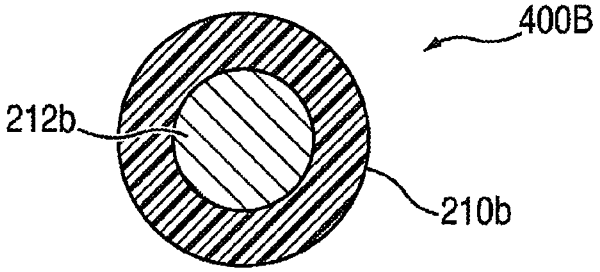
Figure 4C:
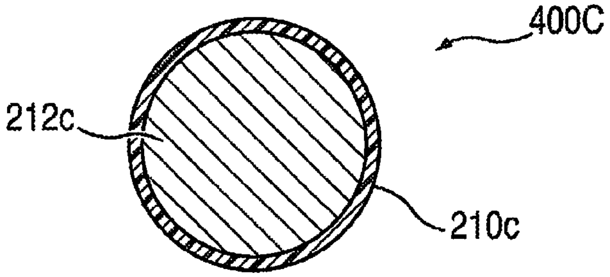

One approach for varying the stiffness of different sections of a cable structure can include changing a shape or cross-section of core 212 in each of the sections. As shown in FIGS. 2 and 3, cable structure 200 can include sections 220 and 224 in which a profile of core 212 are similar, and section 222 in which a profile of core 212 differs from that of sections 220 and 224. FIG. 4A is a cross-sectional view of cable structure 200 taken at line A-A in accordance with some embodiments of the invention. FIG. 4B is a cross-sectional view of cable structure 200 taken at line B-B in accordance with some embodiments of the invention. FIG. 4C is a cross-sectional view of cable structure 200 taken at line C-C in accordance with some embodiments of the invention. By changing the profile of core 212 within each section, shown by the difference in shapes of core 212*a* of cross-section 400A, core 212*b* of cross-section 400B, and core 212*c* of cross-section 400C, a bending moment or moment of inertia associated with at least two sections (e.g., sections 220 and 222, or sections 222 and 224) can differ. The difference in mechanical properties of each section of cable structure 200 can result in different resistance to bending. In particular, because of its smaller profile, core 212*b* can bend more easily than either of core 212*a* or core 212*c*.

The different segments of cable structure 200 can have any suitable length. For example, stiffer sections 220 and 224 can be longer than flexible section 222. Alternatively, the sections can have similar lengths, or stiffer sections 220 and 224 can be shorter than flexible section 222. The disposition and size of the different sections of cable structure 200 can be defined to minimize or reduce overlapping of or looping of the cable structure, which can cause tangling.

Shell 210 can vary in each of the cable structure segments. For example, shell 210*a* of cross-section 400A and shell 210*c* or cross-section 400C can include similar dimensions (e.g., similar inner and outer diameters corresponding to a thin shell or wall). Shell 210*b* of cross-section 400B, however, may have a smaller inner diameter than shell 210*a* or 210*c* to accommodate the smaller dimensions of core 212*b* (e.g., a larger shell or wall thickness). The outer diameter for shell 210*b*, however, may be the same as the outer diameter for other sections of cable structure 200 (e.g., the same as shell 210*a* and shell 210*c*), to provide a smooth and continuous outer surface for cable structure 200. Because shell 210 can be constructed from a different material than core 212, and in particular from a material having different mechanical properties, the sections of cable structure 200 that include a thicker shell 212 may have a different susceptibility to bending than sections of cable structure 200 that have a thinner shell 212.

Cable structure 200 can be constructed using any suitable approach. In some embodiments, material for core 212 can be extruded around conductive wires using a variable-sized die. As the die diameter is reduced, the core diameter can decrease and create a flexible segment of the wire. In some embodiments, core 212 can instead or in addition be constructed using a molding process (e.g., a compression mold, a top-down mold, or an injection mold). The mold used can have variable cross-sections for defining different core sizes corresponding to stiff and flexible segments. Once the core has been appropriately shaped, cosmetic tubing can be placed around the core to form sheath 210. As another example, a molding process (e.g., double shot molding) can be used to form sheath 210 over core 212. The resulting cosmetic sheath can have a substantially smooth shape that hides cutouts, variations of the core diameter, or other features of the core.

Figure 5:
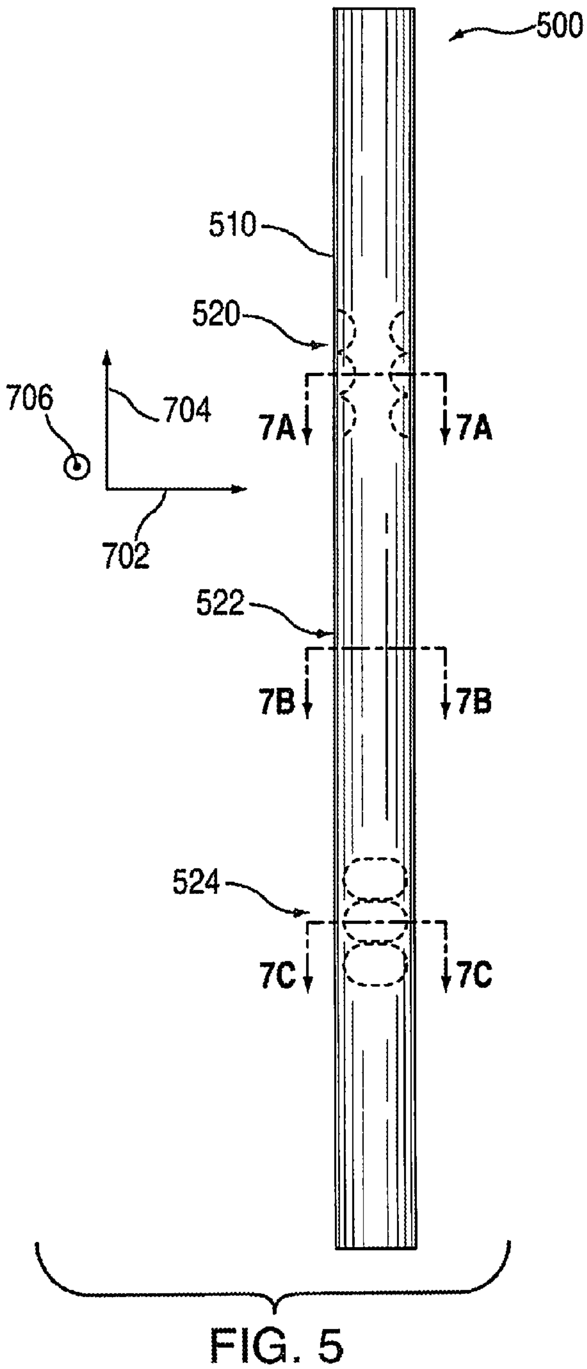
FIG. 5 is an illustrative view of a portion of a cable structure in accordance with some embodiments of the invention.
Figure 6:
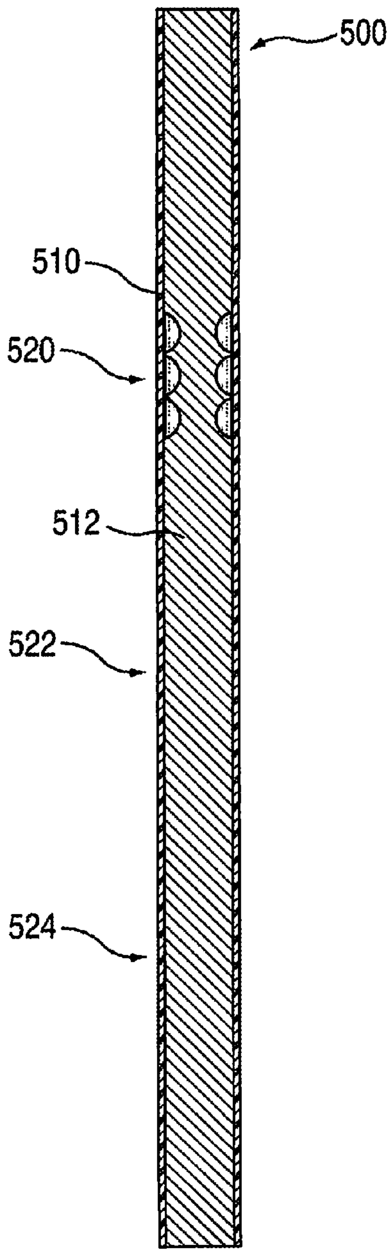
FIG. 6 is a sectional view of the portion of the cable structure of FIG. 5 in accordance with some embodiments of the invention.

In the example of cable structure 200, sections of the cable structure that are more susceptible to bending can bend in any orientation. In some cases, it may be desirable to further control a direction or orientation of bending. FIG. 5 is an illustrative view of a portion of a cable structure in accordance with some embodiments of the invention. FIG. 6 is a sectional view of the portion of the cable structure of FIG. 5 in accordance with some embodiments of the invention. Cable structure 500 can include shell 510 placed over core 512, which can enclose conductors (not shown). Shell 510 and core 512 can include some or all of the features of the shell 210 and core 212, described above.

Figure 7A:
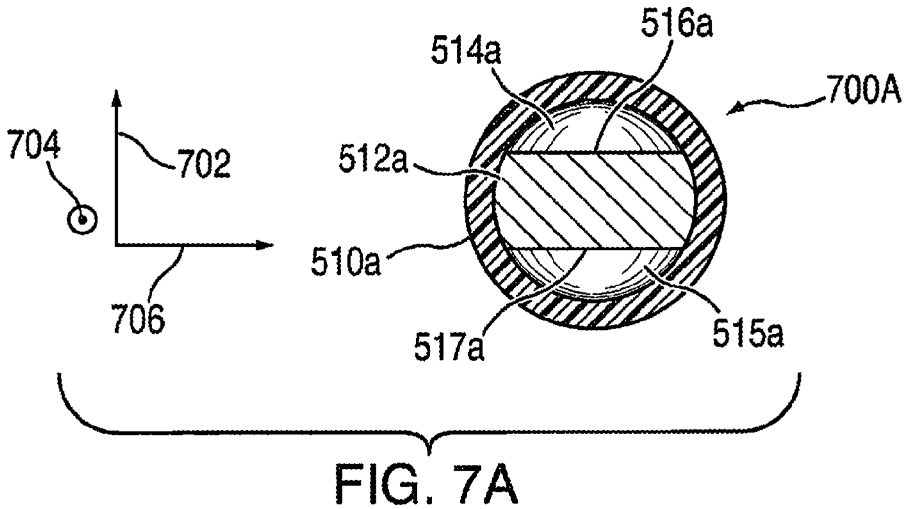
FIG. 7A-7C are cross-sectional views of cable structure 500 taken at lines A-A, B-B, and C-C, respectively, in accordance with some embodiments of the invention.
Figure 7B:
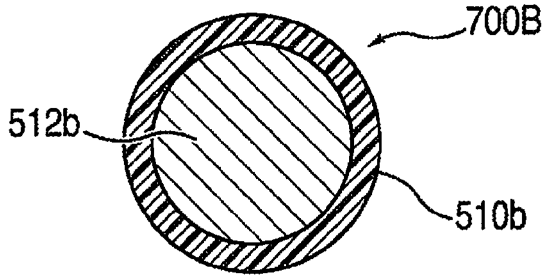
Figure 7C:
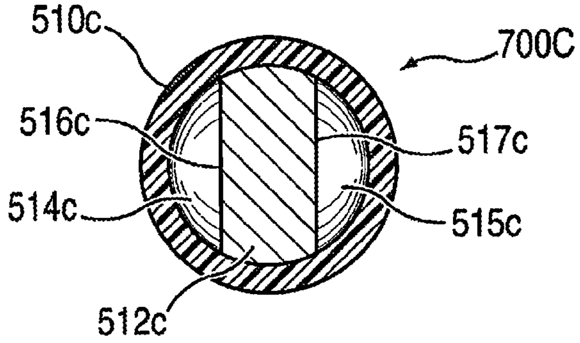

One approach for controlling an orientation or direction of bending can include providing a core that has an axis of symmetry around which bending can be facilitated. As shown in FIGS. 5 and 6, cable structure 500 can include sections 520, 522 and 524 in which a profile of core 512 can differ. FIG. 7A is a cross-sectional view of cable structure 500 taken at line A-A in accordance with some embodiments of the invention. FIG. 7B is a cross-sectional view of cable structure 500 taken at line B-B in accordance with some embodiments of the invention. FIG. 7C is a cross-sectional view of cable structure 500 taken at line C-C in accordance with some embodiments of the invention. Sections 520, 522 and 524 can be designed such that bending is facilitated in different orientations. For example, section 520 can be designed to bend in direction 702, section 522 can be designed to be stiff, and section 524 can be designed to bend in direction 706.

In some cases, different cable sections can have different moments of inertia. One approach for providing different moments of inertia can be to provide core 512 with different shapes in each section. For example, core 512*a* in cross-section 700A can include cutouts 514*a* and 515*a* extending through the portion of core 512 in section 520. The cutouts can have any suitable shape including, for example, notches cut into core 512*a*. Cutouts 514*a* and 515*a* can be oriented such that core 512*a* does not extend all the way to shell 510*a* along direction 702 (e.g., base 516*a* of cutout 514*a* and base 517*a* of cutout 515*a* extend in a plane formed by directions 704 and 706). Because cutouts 514*a* and 515*a* reduce the amount of material of core 512*a* in direction 702, the resulting moment of inertia of core 512*a* may allow section 520 to bend more easily in direction 702. Cutouts 514*a* and 515*a* can have any suitable shape, or can extend over any suitable amount of core 512. For example, cutouts 514*a* and 515*a* can include a planar base as described above, or a curved base. The cutouts can extend over any arc of core 512 including, for example an arc having any suitable length or angle. Those with skill in the art will recognize or appreciate that a cross-section of a section may be constant.

Similarly, core 512*b* in cross-section 700B may include no cutouts, and may therefore be more difficult to bend in every direction than cross-section 700A. In particular, a moment of inertia corresponding to core 512*b* may require more force to bend core 512*b* (e.g., section 522) in direction 702 than a moment of inertia of core 512*a* may require to bend core 512*a* (e.g., section 520) in direction 702. To further control bending, core 512*c* in cross-section 700C can include cutouts 514*c* and 515*c* extending through portions of core 512 in section 524. To reduce tangling, one or both of the position and size of cutouts 514*c* and 515*c* can differ from those of cutouts 514*a* and 515*a*. In particular, cutouts 514*c* and 515*c* can be oriented such that core 512*c* does not extend all the way to shell 510*c* along direction 706 (e.g., base 516*c* of cutout 514*c* and base 517*c* of cutout 515*c* extend in a plane formed by directions 702 and 704). Because cutouts 514*c* and 515*c* reduce the amount of material of core 512*c* in direction 706, the resulting moment of inertia of core 512*c* may allow section 524 to bend more easily in direction 706.

The cutouts of core 512 can be constructed using different approaches. In some cases, machining, cutting, grinding, milling, or any other process for removing material can be used to create cutouts 514 and 515 of core 512. Alternatively, core 512 can be manufactured with the cutouts integrated in the core. For example, a molding process can be used in which the mold includes pre-defined cutouts.

The size and number of cutouts used in each section, and the orientation or position of the cutouts can be tuned to control the bending of the cable in a specific manner. In particular, different attributes of the cutout can be tuned to reduce tangling in one or more regions of a cable structure (e.g., reduce tangling in a vicinity of a bifurcation region, or in a vicinity of an end of cable leg).

Figure 8:
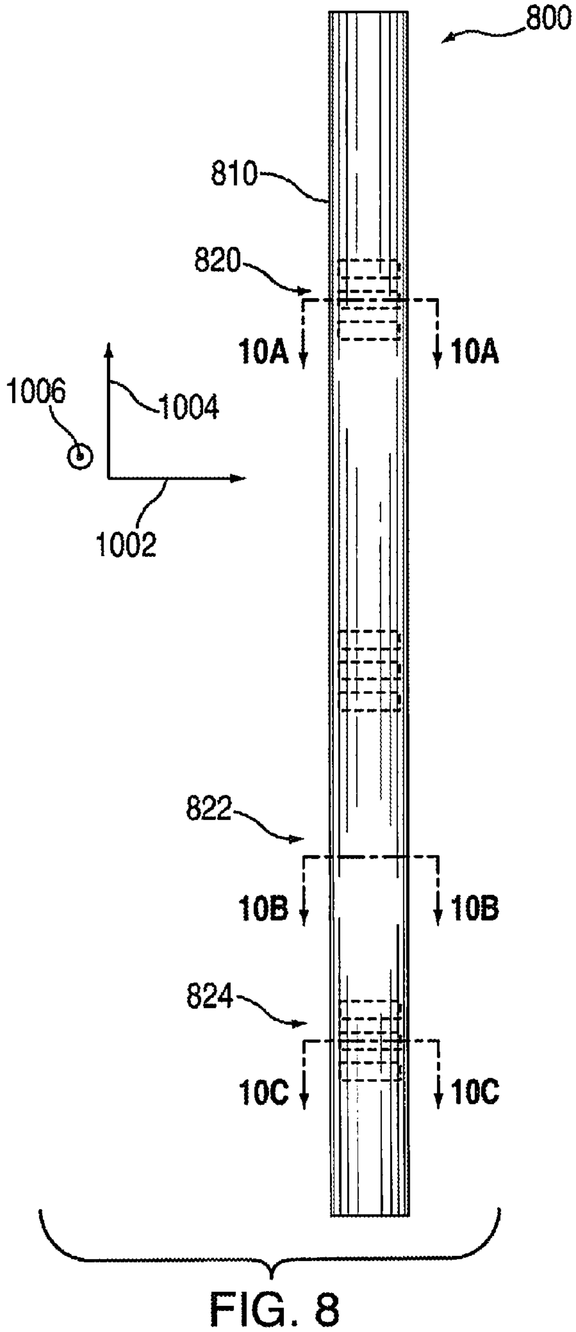
FIG. 8 is an illustrative view of a portion of a cable structure in accordance with some embodiments of the invention.
Figure 9:
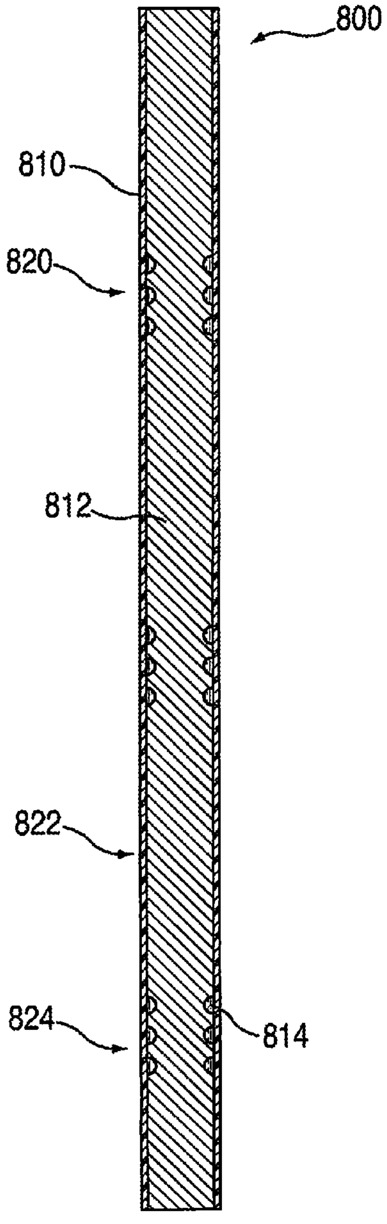
FIG. 9 is a sectional view of the portion of the cable structure of FIG. 8 in accordance with some embodiments of the invention.
Figure 10A:
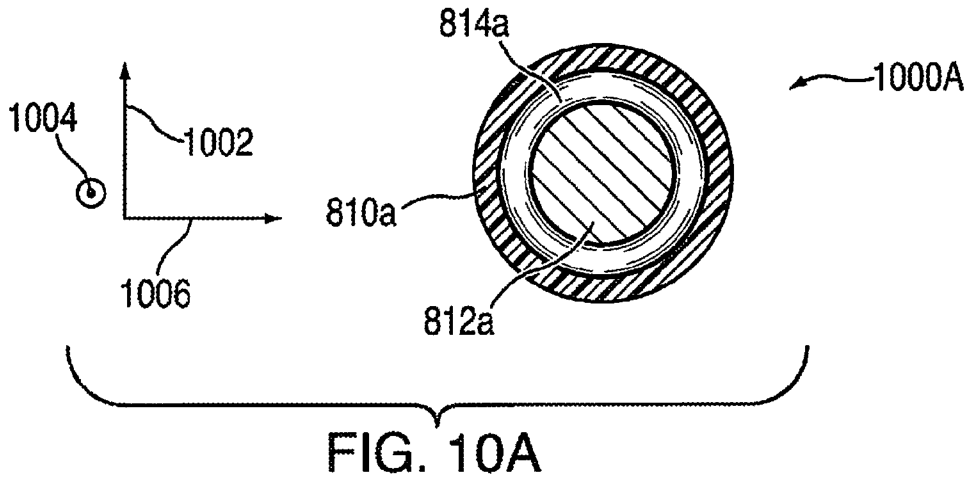
FIG. 10A-10C are cross-sectional views of cable structure 800 taken at lines A-A, B-B, and C-C, respectively, in accordance with some embodiments of the invention.
Figure 10B:
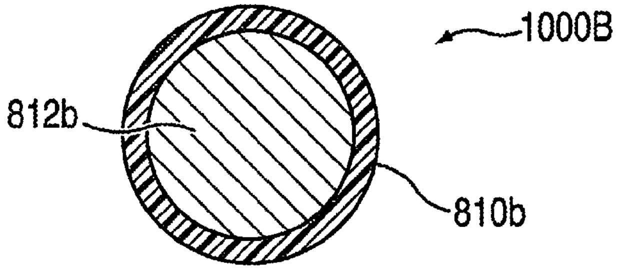
Figure 10C:
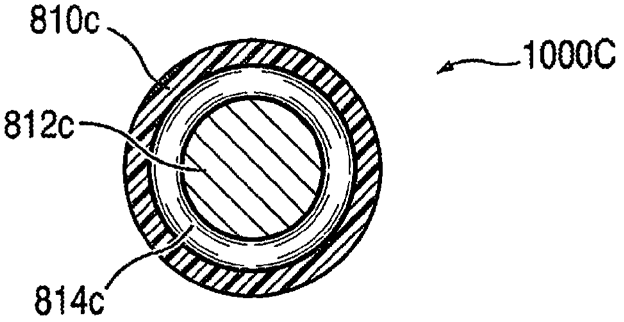

In some cases, a cable structure can include sections with several cutouts that extend around an entire periphery of a cable structure core. FIG. 8 is an illustrative view of a portion of a cable structure in accordance with some embodiments of the invention. FIG. 9 is a sectional view of the portion of the cable structure of FIG. 8 in accordance with some embodiments of the invention. Cable structure 800 can include shell 810 placed over core 812, which can enclose conductors (not shown). Shell 810 and core 812 can include some or all of the features of the shell 210 and core 212, described above. As shown in FIGS. 8 and 9, cable structure 800 can include sections 820, 822 and 824 in which a profile of core 812 can differ such that bending is facilitated or hindered in different sections. FIG. 10A is a cross-sectional view of cable structure 800 taken at line A-A in accordance with some embodiments of the invention. FIG. 10B is a cross-sectional view of cable structure 800 taken at line B-B in accordance with some embodiments of the invention. FIG. 10C is a cross-sectional view of cable structure 800 taken at line C-C in accordance with some embodiments of the invention.

Cable structure 800 can include several different sections 820, 822 and 824 designed to bend in different manners. For example, section 820 can be designed to bend in any of directions 1002 and 1006, section 822 can be designed to be stiff, and section 824 can be designed to bend in any of directions 1002 and 1006. To allow the bending, core 812*a* of cross-section 1000A can include several cutouts 814*a* extending around a periphery of core 812*a*. Because of the cutouts, an outer diameter of core 812*a* may be smaller than an outer diameter of core 812*b* of cross-section 1000B. The cutouts can modify a moment of inertia of core 812*a* in section 820, and facilitate bending in section 820 relative to section 822. Similarly, core 812*c* of cross-section 1000C can include several cutouts 814*c* extending around a periphery of core 812*a*. Because of the cutouts, an outer diameter of core 812*c* may be smaller than an outer diameter of core 812*b* of cross-section 1000B, and can facilitate bending in section 824 relative to section 822.

In contrast with cable structure 200, cable structure 800 can include several cutouts 814 placed in sequence parallel to each other to form a section of cable structure 800. Cable structure 800 can include any suitable number of cutouts having any suitable size. In some cases, a length or orientation of cutouts (e.g., if a cutout does not surround a periphery of core 812) can be selected for each cutout of a cable structure section. The cutouts can thus be tuned to reduce or eliminate tangling of the cable. The cutouts can be constructed using any suitable approach including, for example, one or more of the approaches described above.

Figure 11:
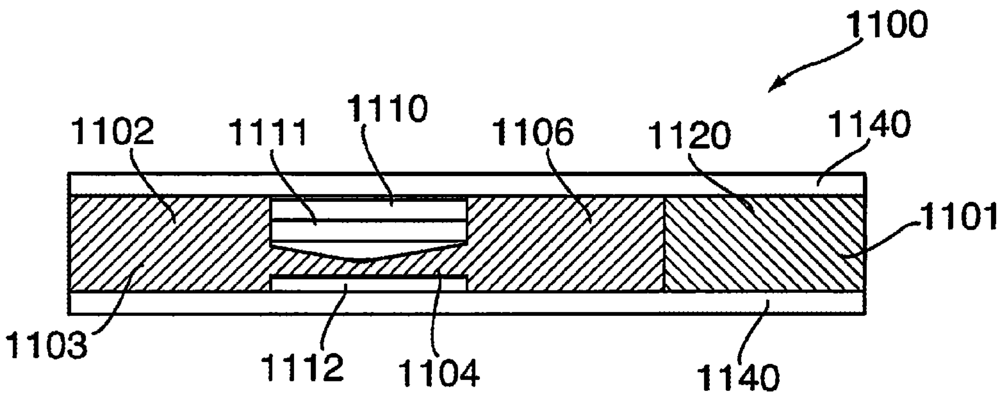
FIG. 11 is a cross-sectional view of an illustrative cable structure in which a core is constructed from several different materials in accordance with some embodiments of the invention.

In some embodiments, other approaches can be used to ensure that different sections of a cable structure are susceptible to bending in different manners. In one implementation, instead of changing a shape of a core in different sections, a material used for the core can vary. FIG. 11 is a cross-sectional view of an illustrative cable structure in which a core is constructed from several different materials in accordance with some embodiments of the invention. Cable structure 1100 can include shell 1140 placed over core 1101. Core 1101 can include several sections constructed from different materials. For example, core 1101 can include section 1102 constructed from elements 1103 and 1106 connected by arm 1104. Section 1110 can extend around arm 1104 and between elements 1103 and 1106 to form an intermediate section. For example, section 1110 can include portions 1111 and 1112 that are positioned on opposite sides of arm 1104, as seen in the cross-sectional view of FIG. 11. It will be understood, however, that portions 1111 and 1112 can be part of a single section having an opening through which arm 1104 extends. Core 1101 can also include section 1120 placed adjacent to section 1102. The sections of core 1101 can be substantially aligned with an axis of cable structure 1100, and can have similar outer diameters such that shell 1140 can provide a smooth and continuous cosmetic outer surface. By using different materials for each segment, the moments of inertia of each segment can differ, and the susceptibility of each segment to bend can be controlled.

Figure 12:
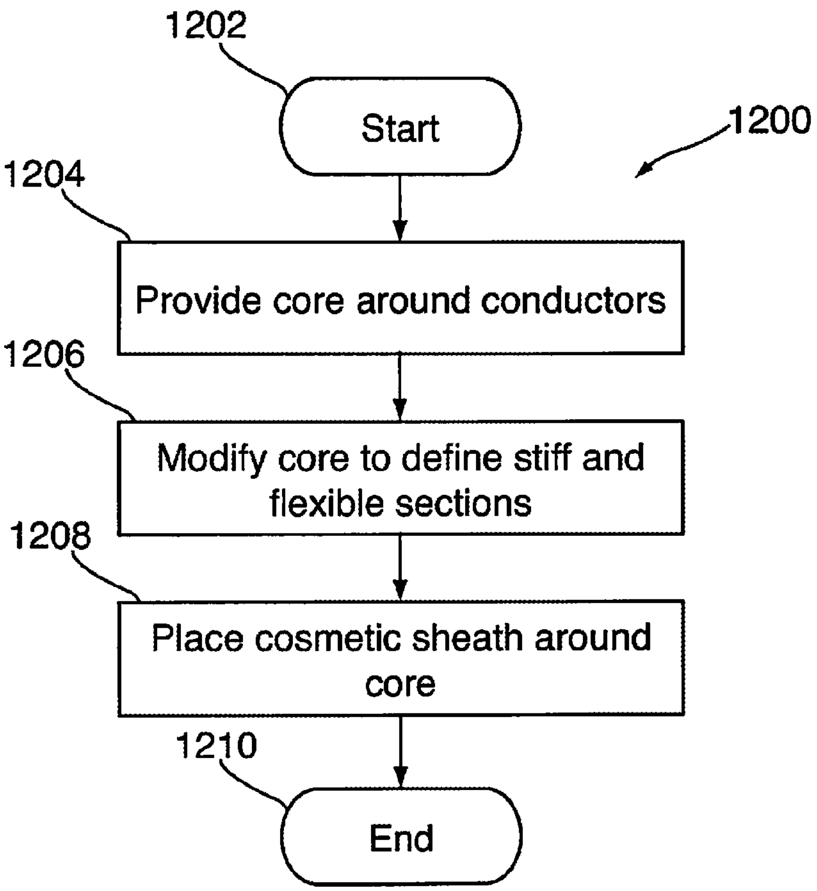
FIG. 12 is a flowchart of an illustrative process for creating a cable structure in accordance with some embodiments of the invention.

FIG. 12 is a flowchart of an illustrative process for creating a cable structure in accordance with some embodiments of the invention. Process 1200 can begin at step 1202. At step 1204, a core can be provided around conductors of a cable structure. The conductors can serve to transfer electrical signals through the cable structure. The core can be provided from a material that provides thickness to the cable structure. For example, the core can be constructed from a polymer, TPU, TPE, or any other suitable material. The core can be constructed using molding, drawing, or any other suitable process. At step 1206, the core can be modified to define stiff and flexible sections of the cable structure. For example, one or more sections of the cable structure can include cutouts. As another example, one or more sections of the cable structure can have a variable cross-section. As still another example, different sections of the core can be constructed from different materials. In some embodiments, the core shape can be defined as part of the process by which the core is placed around the conductors of the cable structure.

At step 1208 a cosmetic sheath can be placed around the core. For example, tubing can be placed around the core. As another example, a cosmetic sheath can be molded around the core. The cosmetic sheath can have a substantially smooth shape that hides cutouts or other features of the core. Process 1200 can then end at step 1210.

The previously described embodiments are presented for purposes of illustration and not of limitation. It is understood that one or more features of an embodiment can be combined with one or more features of another embodiment to provide systems and/or methods without deviating from the spirit and scope of the invention.

What is claimed is:

1. A cable comprising: a conductor extending along an axis of the cable; and a unibody core completely surrounding the conductor about the axis in every plane that is perpendicular to the axis along a portion of a length of the conductor along the axis, wherein:

a first outer periphery of the core in a first plane perpendicular to the axis comprises a first geometry;

a second outer periphery of the core in a second plane perpendicular to the axis comprises a second geometry;

the first plane is different than the second plane;

the first geometry is different than the second geometry;

a portion of the core in the first plane allows the core to bend more easily in a first direction that is perpendicular to the axis than in a second direction that is perpendicular to the axis; and a portion of the core in the second plane allows the core to bend more easily in the second direction than in the first direction.

2. The cable structure of claim 1, wherein the shortest distance in the first plane between the axis and the first outer periphery of the core is less than the shortest distance in the second plane between the axis and the second outer periphery of the core.

3. The cable structure of claim 1, wherein the thickness of the core varies along the axis.

4. The cable structure of claim 1, wherein:

the first direction is perpendicular to the second direction.

5. The cable structure of claim 1, wherein:

the portion of the core in the first plane comprises a first moment of inertia with respect to the axis; and the portion of the core in the second plane comprises a second moment of inertia with respect to the axis that is different than the first moment of inertia.

6. The cable structure of claim 5, wherein:

the first direction is perpendicular to the second direction;

the first moment of inertia allows the core to bend more easily in the first direction than in the second direction; and the second moment of inertia allows the core to bend more easily in the second direction than in the first direction.

7. The cable of claim 1, wherein the first geometry is different than the second geometry with respect to size.

8. The cable of claim 1, wherein the first geometry is different than the second geometry with respect to shape.

9. The cable of claim 1, wherein the first geometry is different than the second geometry with respect to size and shape.

10. The cable of claim 1, further comprising a shell surrounding the core about the axis, wherein:

a first outer periphery of the shell in the first plane comprises a first shell geometry;

a second outer periphery of the shell in the second plane comprises a second shell geometry; and the first shell geometry is the same as the second shell geometry.

11. A cable comprising: a conductor extending along a length of a cable; and a unibody core disposed around the conductor along a portion of the length of the cable, wherein a thickness of the core varies along the portion of the length of the cable to enable a first portion of the core to bend more easily in a first direction that is perpendicular to the axis than in a second direction that is perpendicular to the axis and to enable a second portion of the core to bend more easily in the second direction than in the first direction.

12. The cable of claim 11, further comprising a shell disposed around the core along the portion of the length of the cable, wherein the outer periphery of the shell is the same along the portion of the length of the cable.

13. The cable of claim 11, further comprising a shell disposed around the core along the portion of the length of the cable, wherein the shell provides a smooth and continuous outer surface of the cable.

14. The cable of claim 11, further comprising a shell disposed around the core along the portion of the length of the cable, wherein an empty area exists between an outer periphery of the core and an outer periphery of the shell in at least one cross-section of the cable.

15. A cable comprising: a conductor extending along a length of a cable; and a core disposed around the conductor along a portion of the length of the cable, wherein:

the core comprises a first core section and a second core section;

the first core section extends along the entire portion of the length of the cable;

the second core section extends along at least a sub-portion of the portion of the length of the cable;

the first core section provides a first portion of an outer surface of the core;

the second core section provides a second portion of the outer surface of the core;

the first core section is constructed from a first core material;

the second core section is constructed from a second core material;

the first core material is different than the second core material;

the outer surface of a portion of the core comprising the first portion and the second portion is smooth and continuous; and a portion of the first core section extends through an opening in the second core section.

16. The cable of claim 15, wherein the second core section extends along only the sub-portion of the portion of the length of the cable.

17. The cable of claim 15, wherein the first core section comprises a first moment of inertia with respect to the length of the cable and the second core section comprises a second moment of inertia with respect to the length of the cable that is different than the first moment of inertia.

18. The cable of claim 17, wherein each one of the first core section and the second core section is aligned about a longitudinal axis of the cable.

19. The cable of claim 15, wherein each one of the first core section and the second core section is aligned about a longitudinal axis of the cable.

* * * * *